Patented June 9, 1953

2,641,604

UNITED STATES PATENT OFFICE 2,641,604

ALUMINUM SALTS OF DIBASIC AMINO ACIDS

John W. Le Maistre and Irvine W. Grote, Chattanooga, Tenn., assignors to The Chattanooga Medicine Company, Chattanooga, Tenn., a corporation of Tennessee No Drawing. Application May 28, 1949, Serial No. 96,158

11 Claims. (Cl. 260—448)

The present invention relates to compositions for use in relieving excess gastric acidity and to a method for preparing such compositions.

Probably the most commonly used method for the relief of gastric acidity involves the use of sodium bicarbonate, which has a very rapid action. However, the use of bicarbonate is not too satisfactory, since an excess of that material will cause acid rebound, or increased production of acid by the stomach. Another commonly used anti-acid compound is aluminum hydroxide, but this compound has the objection that its action is slow, especially when used as a dry preparation.

An object of the invention is to prepare anti-acid agents for the relief of excess gastric acidity and stomach distress.

A further object of the invention is to prepare anti-acid agents having the ability of maintaining the pH of the digestive system at higher levels than aluminum hydroxide, yet without the possibility of reaching an alkaline condition.

A further object of the present invention is to provide a method for the preparation of anti-acid compounds having the advantages given above.

The anti-acid compounds of the present invention may be characterized as di-metallic salts of acidic amino acids. The compounds proposed herein have the following general formula:

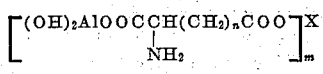

where X may be an alkali metal, alkaline earth metal, a hydroxy substituted alkaline earth metal ion, an ammonium ion, or the di-hydroxy aluminum ion, and $m$ and $n$ are integers 1 or 2.

For the purposes of this specification, "magnesium" is included in the alkaline earth metal group.

The acidic amino acids, such as glutamic acid and aspartic acid, are dibasic amino acids which have an acid reaction, as distinguished from neutral amino acids such as glycine and basic di-amino acids such as lysine.

The three preferred compounds of the present invention are the dihydroxy aluminum sodium glutamate, tetrahydroxy di-aluminum magnesium di-glutamate, and tetra-hydroxy di-aluminum glutamate. In general, the alkali metal and alkaline earth metal compounds may be prepared by reacting the amino acid, such as glutamic acid or aspartic acid, with a water-soluble alkali metal or alkaline earth metal compound to form the corresponding acid salt, and then reacting the salt thus formed with an aluminum alcoholate. Typical among the latter compounds are aluminum isopropylate and aluminum isobutylate. Approximately equal molecular proportions of the amino acid compound and the aluminum alcoholate are used in the case of the alkali metal and alkaline earth metal derivatives.

In the preparation of the di-aluminum salt, one molar proportion of the acid is used to two molar proportions of the alcoholate. The precipitate resulting from the addition of the alcoholate to the solution of the acid or its derivative is recovered, filtered, and dried.

The compounds of the present invention have the therapeutic advantage of low aluminum content as compared to the aluminum content of aluminum hydroxide. Aluminum base anti-acids, such as aluminum hydroxide, have been reported to show a constipating effect which is attributable to the relatively high percentage of aluminum in the molecule. Thus, the theoretical percentage of aluminum in aluminum hydroxide is 34.6% while in the dihydroxy aluminum sodium glutamate the aluminum percentage is only 11.7%. In the tetra-hydroxy di-aluminum magnesium diglutamate, the theoretical aluminum percentage is 12.4%, and in the tetrahydroxy di-aluminum glutamate the percentage is 20.5%. Since some aluminum hydroxide is coprecipitated together with the products, the aluminum content of the precipitated product is somewhat higher than the theoretical value. However, the aluminum content is still considerably lower than that of aluminum hydroxide itself.

In the case of each compound, the anti-acid dosage required is approximately the same as that for aluminum hydroxide.

Probably the most distinctive advantage of the present compounds over the aluminum compounds previously used is their ability to maintain the pH of acidic solutions, such as the digestive juices, at higher levels for longer periods of time than the previously used compounds. The buffer properties of the various compounds were tested by the method of Holbert, Noble and Grote, as described in the Journal of the American Pharmaceutical Association, volume 37, Page 292 (1948). In this test, 2.0 grams of the salt to be tested are stirred with 150 ml. of artificial gastric juice having a pH of 1.6 at a temperature of 38° C. The mixture is thoroughly agitated so that no settling of the anti-acid material occurs. The pH of the mixture is determined at intervals, and after 10 minutes, 20 ml. of the reaction mixture is removed and replaced with 20 ml. of fresh artificial gastric juice at 38° C. This process is repeated at ten-minute intervals until the pH indicates that the neutralizing power of the antiacid is spent. The preparation and the results obtained from testing the present compounds in the manner described by Holbert, Noble and Grote appear in the following examples:

EXAMPLE I

*Dihydroxy aluminum sodium glutamate*

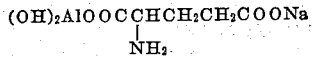

16.9 grams (0.1 mol.) of sodium acid glutamate were dissolved in 50 cc. of water. The solution was stirred with the gradual addition of 20.4 grams (0.1 mol.) of aluminum isopropylate during a period of about 5 minutes. The precipitation commenced immediately and the mixture became quite thick. About mid-way in the addition of the aluminum isopropylate, another 50 cc. of water was used. When all of the aluminum isopropylate had been added, the mixture was allowed to stand overnight and was then filtered. The resulting solid was washed with water and dried to granular form. 20 grams of dihydroxy aluminum sodium glutamate were thus recovered.

When 2.0 grams of this salt were stirred with 150 cc. of artificial gastric juice having a pH of 1.6, in accordance with the above-mentioned Holbert et al. test, the pH was raised to 4.1 in one minute. Under the identical conditions, the addition of 2.0 grams of dried aluminum hydroxide U. S. P. raised the pH to 2.8. The maximum pH obtained in the test using dihydroxy aluminum sodium glutamate was 4.4, and occurred at the end of ten minutes. The pH of the solution was maintained above 3 for a period of 150 minutes. In the case of aluminum hydroxide, the maximum pH attained was 3.9, while the pH was maintained above 3 for a period of 120 minutes.

The corresponding potassium and ammonium salts are prepared by the same method as described for the sodium salt, with the use of the corresponding potassium and ammonium compounds.

EXAMPLE II

*Tetrahydroxy dialuminum magnesium diglutamate*

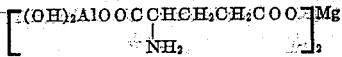

29.6 grams (0.2 mol.) of glutamic acid and 4.0 grams (0.1 mol.) of magnesium oxide were added to 100 cc. of water, and the mixture was heated until the solution was clear. To this solution of magnesium acid glutamate were added 41 grams (0.2 mol.) of aluminum isopropylate with constant stirring during a period of 15 minutes. Precipitation began at once, and considerable heat was evolved. After cooling, the solid was filtered off and washed with isopropyl alcohol. The resulting product was dried to a white, granular solid. 40.5 grams of tetrahydroxy dialuminum magnesium diglutamate were thus recovered.

When 2.0 grams of this magnesium salt were tested in the manner described above, the pH was raised to 3.8 in one minute. The maximum pH of 4.3 was obtained in ten minutes, and the pH was maintained above a value of 3.0 for 160 minutes.

The corresponding calcium and barium compounds are prepared by replacing the magnesium oxide with calcium and barium oxide, respectively. The hydroxy substituted alkaline earth derivatives are prepared in the same manner, except that the proportion of glutamic acid used is approximately equimolar with respect to the alkaline earth oxide.

EXAMPLE III

*Tetrahydroxy di-aluminum glutamate*

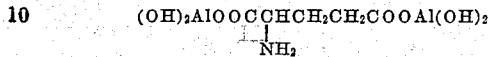

147 grams (1 mol.) of glutamic acid were dissolved in 1,470 cc. of boiling water. The resulting solution and 408 grams (2 mol.) of aluminum isopropylate were separately and simultaneously poured into one liter of isopropyl alcohol with good stirring at a rate such that both additions were complete in about ten minutes. Precipitation began at once, and considerable heat was evolved. The resulting mixture was stirred until cold, filtered, and the product dried. The product, tetrahydroxy di-aluminum glutamate, was a white, granular solid weighing 299 grams.

This compound maintained the pH of the artificial gastric juice above a value of 3.0 for 160 minutes.

All of the products, the preparation of which is described above, are white solids, insoluble in water, and containing 8 to 13% moisture after drying at 100° C.

While the examples given above describe the preparation of glutamic acid salts, the corresponding salts can be prepared from aspartic acid in exactly the same manner.

In a previous application, Krantz and Kibler have described and claimed certain basic aluminum salts of aliphatic amino acids such as glycine. This application is Serial No. 667,124, filed May 3, 1946, now Patent No. 2,480,743, and is entitled "Pharmaceutical Composition and Method of Preparing the Same." A typical example of the Krantz and Kibler compounds is the dihydroxy aluminum aminoacetate. We have found that the compounds of the present invention compare favorably with the previously proposed compounds in several respects, especially with regard to their ability to maintain the pH values at higher levels. Thus, under the previously discussed test conditions, dihydroxy aluminum aminoacetate yields a maximum pH of 3.9 in the artificial gastric juice, and maintains the pH value above 3 for a period of 140 minutes.

It will be evident that various details of the process may be varied through a wide range without departing from the principles of this invention, and it is, therefore, not the purpose to limit the patent granted hereon otherwise than necessitated by the scope of the appended claims.

We claim as our invention:

1. As a new compound, a salt of a dibasic amino acid having the formula

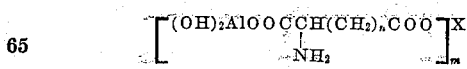

where X is a member of the group consisting of the alkali metals, alkaline earth metals, ammonium ion, hydroxy substituted alkaline earth metal ion, and Al(OH)$_2$ and $m$ and $n$ are integers 1 or 2.

2. The method of preparing a sodium dihydroxy aluminum salt of glutamic acid which comprises dissolving sodium glutamate in water, incorporating an aluminum alcoholate into the resulting solution, and recovering the precipitate thus formed.

3. The method of preparing tetrahydroxy di-aluminum magnesium diglutamate which comprises providing a solution of magnesium acid glutamate, incorporating an aluminum alcoholate into said solution, and recovering the precipitate thus formed.

4. As a new compound, dihydroxy aluminum sodium glutamate having the formula:

5. As a new compound, tetrahydroxy di-aluminum magnesium diglutamate having the formula:

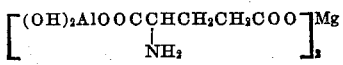

6. As a new compound, tetrahydroxy di-aluminum glutamate having the formula:

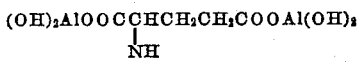

7. Basic disubstituted salts of glutamic acid in which at least one of its substituents is aluminum.

8. Basic disubstituted salts of glutamic acid in which one of the substituents is selected from the group consisting of aluminum, sodium and magnesium and the other substituent is aluminum.

9. The method of preparing a salt of a dibasic amino acid having the formula

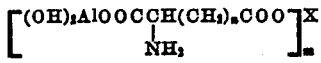

where X is a member of the group consisting of the alkali metals, alkaline earth metals, ammonium ion, hydroxy substituted alkaline earth metal ion, and $Al(OH)_2$ and $m$ and $n$ are integers 1 or 2, which comprises reacting the corresponding dibasic amino acid in aqueous solution with an alkaline reacting compound selected from the group consisting of alkali metal and alkaline earth metal oxides and hydroxides and ammonium hydroxide, incorporating an aluminum alcoholate into the resulting solution, and recovering the resulting precipitate.

10. The method of preparing tetrahydroxy di-aluminum aspartate, which comprises providing a solution of aspartic acid and water, incorporating an aluminum alcoholate into the resulting solution and recovering the precipitate thus formed.

11. As a new compound, tetrahydroxy di-aluminum aspartate.

JOHN W. LE MAISTRE.
IRVINE W. GROTE.

References Cited in the file of this patent

UNITED STATES PATENTS

| Number | Name | Date |
|---|---|---|
| 2,480,743 | Krantz, Jr., et al. | Aug. 30, 1949 |

OTHER REFERENCES

Beilsten: vol. IV, 4th Edition, 1944, page 491.
Krantz, Jr., et al.—J. of Pharmacology and Experimental Therapeutics, vol. 82, pages 247–253, Nov. 1944.
C. A., vol. 5, page 1592.